United States Patent [19]

Franzen et al.

[11] 4,443,784

[45] Apr. 17, 1984

[54] FAULT DETECTION IN ELECTRONIC VEHICLE CONTROLS

[75] Inventors: Horst Franzen, Hemhofen; Wolfgang Rothmeier, Erlangen, both of Fed. Rep. of Germany

[73] Assignee: Siemens Aktiengesellschaft, Munich, Fed. Rep. of Germany

[21] Appl. No.: 379,376

[22] Filed: May 17, 1982

Related U.S. Application Data

[63] Continuation of Ser. No. 161,281, Jun. 19, 1980.

[30] Foreign Application Priority Data

Jun. 28, 1979 [DE] Fed. Rep. of Germany ....... 2926132

[51] Int. Cl.³ .............................................. B60Q 1/00
[52] U.S. Cl. .................................. 340/52 F; 340/520
[58] Field of Search ............................... 340/52 F, 520

[56] References Cited

U.S. PATENT DOCUMENTS

| | | | |
|---|---|---|---|
| 3,960,011 | 6/1976 | Renz et al. ..................... | 340/520 X |
| 4,031,363 | 6/1977 | Freeman et al. ................. | 340/52 F |
| 4,053,868 | 10/1977 | Cox et al. ......................... | 340/52 F |
| 4,184,146 | 1/1980 | Fratzke et al. ..................... | 340/52 F |
| 4,188,618 | 2/1980 | Weisbart ........................... | 340/52 F |
| 4,246,493 | 1/1981 | Beeghly ........................... | 340/520 X |
| 4,246,566 | 1/1981 | Endo et al. ....................... | 340/52 F |

*Primary Examiner*—David L. Trafton
*Attorney, Agent, or Firm*—Kenyon & Kenyon

[57] ABSTRACT

A fault signal indicating system which contains a bistable memory device which changes from a first to a second stable state in response to a fault signal. Simple logic circuitry is provided for disabling the memory device while it is in the second state so that it will not be affected by secondary fault signals. In systems where a plurality of bistable memory devices are used, each being associated with a respective one of plural fault signal outputs, logic circuitry is employed to disable predetermined ones of the memories in response to any one of them being in the second state. Voltage regulation and power interruption circuitry is provided to disable the memory devices when power supply voltages fall below predetermined levels. Circuitry is provided for resetting all of the memories simultaneously to the first stable state.

3 Claims, 1 Drawing Figure

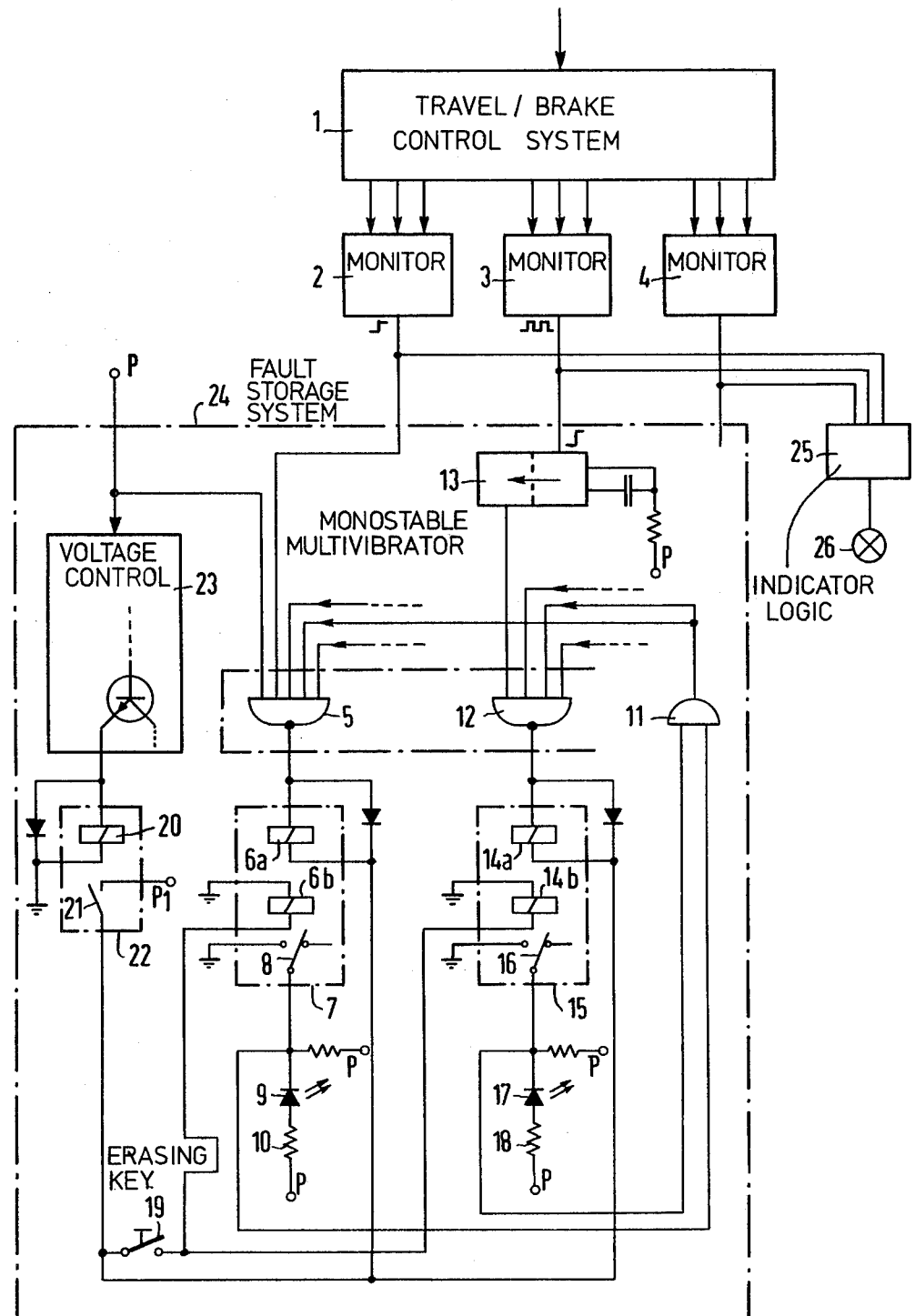

FAULT DETECTION IN ELECTRONIC VEHICLE CONTROLS

This application is a continuation of application Ser. No. 161,281, filed June 19, 1980.

BACKGROUND OF THE INVENTION

1. Field of the Invention

This invention relates to arrangements for detecting fault conditions in electronic vehicle controls, and more specifically to arrangements for preserving the identity of fault condition indications.

2. Description of the Prior Art

Increases in the speed, sophistication, and complexity of modern mass transit systems have resulted in a corresponding increase in the complexity of electronic vehicle controls. In the course of operating a rapid transit system which is in use in Dusseldorf, Federal Republic of West Germany, it has been learned that in the event of a malfunction, operating personnel do not possess sufficient technical understanding of the complex electronic control technology to identify a fault condition. Thus, as a result of this lack of understanding of the technology and the fact that such operating personnel must concern themselves with the safety and comfort of the passengers in the event of a malfunction, they are unable to provide to maintenance personnel sufficient information which will enable such maintenance personnel to recognize the fault. Moreover, since some faults are intermittent in nature, or related to the operating temperature of the system, maintenance personnel are not able to efficiently localize the fault after the equipment has been removed from service and brought to the maintenance facility.

Vehicle controls of the type used in the Dusseldorf rapid transit system generally contain a number of monitoring devices which transmit fault signals to one or more vehicle controllers. The outputs of the vehicle controllers are combined so as to form a collective signal which is conducted to the fault indicating device of the vehicle. However, the collective signal and the responsive indication at the fault indicating device are cancelled when the vehicle is shut down, and is therefore not available to maintenance personnel during the course of their examination of the vehicle in the maintenance facility. This arrangement makes the servicing of intermittent fault conditions extremely difficult and time consuming.

In addition to the foregoing, operating personnel are generally confused at the time that a fault situation arises, by the fact that a plurality of fault conditions may be present simultaneously. For example, if a primary fault arises which is of the type which causes automatic braking of the vehicle, a plurality of secondary fault signals may be produced shortly thereafter. One such secondary signal may be produced by a speed detector in the system which may have determined that the braking deceleration is excessive in view of the condition of the track.

Accordingly, it is an object of this invention to provide an arrangement which reduces the time and costs required for finding faults in rapid transit vehicles.

It is a further object of this invention to provide an arrangement which preserves the identity of the source of a fault indicating signal after the vehicle has been removed from service.

SUMMARY OF THE INVENTION

The foregoing and other problems in the prior art are alleviated by the herein disclosed invention which advantageously records the identity of the source of a fault indicating signal after the vehicle has been shut down and removed from service. In one embodiment of the invention, a plurality of monitoring devices are connected to respectively associated circuits containing memory devices which are responsive to primary fault signals. The memory devices are of a type which preserve an indication after the vehicle has been shut down. Circuitry is provided for inhibiting the storage of secondary fault indications after the primary fault indication has been stored.

It is, therefore, a feature of this invention that maintenance personnel can quickly localize a fault condition after the vehicle has been shut down and without diagnostic information from operating personnel.

It is also a feature of this invention that faults can be localized without interference from secondary fault indications.

BRIEF DESCRIPTION OF THE FIGURE

Comprehension of the invention is facilitated by reference to the following detailed description in conjunction with the FIGURE which shows an illustrative embodiment of the invention partly in block and line form and partly in schematic representation.

DETAILED DESCRIPTION

The FIGURE shows a block and line representation of a travel/brake control system 1 of a vehicle which is operatively connected to monitoring devices 2, 3 and 4. The circuitry contained within the travel/brake control system and the monitoring devices is not disclosed in detail because these system components are not elements of the invention. They are presented herein only to provide the background context of a system in which the invention may be employed.

Each of the monitoring devices receives a plurality of signals from travel/brake control system 1. Illustratively, monitoring device 2 receives a braking current signal, a velocity signal, and a brake command signal. If during a braking operation the braking current in a braking circuit within the vehicle increases in time in accordance with a predetermined amplitude-time function, monitoring device 2 will not produce an output signal, thereby signifying that a fault has not occurred within the travel/braking control system.

Monitoring device 3 may illustratively receive pulse signals which correspond to the rotational speed of the axles of the vehicle. This monitoring device may be of a type which produces a timing signal at its output during the time that axle speed pulses are received without interruption.

Monitoring device 4 may illustratively receive a travel command signal and a reference-value transmission signal from travel/braking control system 1. If the reference value transmission signal is properly transmitted, monitoring device 4 will produce an output signal having a value of 0.

The outputs of monitoring devices 2, 3 and 4 are connected to a fault storage system which is generally shown at 24, and to a logic unit 25 which is connected to an indicating device 26. Logic unit 25 contains known logic circuitry, which is therefore not shown in detail, for operating indicating device 26 in response to a fault signal at any of the outputs of monitoring devices 2, 3 or 4. Thus, activation of indicating device 26 will inform the operator that at least one unidentified malfunction exists in the vehicle.

In the event that monitoring device 2 determines that the signals that it receives from travel/brake control system 1 represent a fault condition, the voltage at its output will rise from a logical 0 state to a logical 1 state. The output of monitoring device 2 is connected to an input of NAND gate 5. Assuming that the vehicle has been operating without a preexisting fault condition, NAND gate 5 is enabled, thereby energizing coil 6a of bistable relay 7. Current is delivered from power supply P1 through normally open contact 21 of relay 22, through coil 6a to the low voltage output (logic 0 state), of enabled NAND gate 5. Such energization of relay coil 6a causes relay contact 8 to close, thereby completing the series circuit containing resistor 10 and light emitting diode 9. Moreover, the switching operation reduces the voltage at the cathode of light emitting diode 9, thereby disabling AND gate 11 which is connected at its output to respective inputs of NAND gates 5 and 12. Thus, NAND gates 5 and 12 are disabled so as to prevent the transmission of secondary fault indications.

Monitoring device 3 is of a type which produces a pulsed output signal if there is no fault in the travel/braking control system. Thus, a fault condition will cause the output of monitoring device 3 to remain in a steady state of either no signal or continuous signal. This arrangement provides safety advantages over the output signal of the type described hereinabove with respect to monitoring device 2, because a fault will be detected irrespective of whether the output signal of monitoring device 3 is maintained at a constant logical 1 or logical 0 state. The output of monitoring device 3 is connected to a monostable multivibrator 13 which, in this embodiment of the invention, is of the type that produces a continuous logical 1 output state unless it is triggered by the output pulses of monitoring device 3. Accordingly, as long as the logical 0 to logical 1 state transitions are provided at the input of monostable multivibrator 13 at a repetitive rate which is faster than its reset period, the output of monostable multivibrator 13 will remain at a logical 0 state. At such time as the output of monitoring device 3 remains constant, the multivibrator will reset to a logical 1 state thereby enabling NAND gate 12. In a manner similar to the operation of bistable relay 7, bistable relay 15 will consequently conduct current through coil 14a which causes contact 16 to close. Thus, current is conducted through the series circuits of resistor 18 and light emitting diode 17. Moreover, AND gate 11 is simultaneously disabled so as to inhibit the transmission of secondary fault signals through NAND gates 5 or 12.

It should be noted that the fault condition indicated by light emitting diodes 9 and 17 are available only to maintainence personnel. The operator of the vehicle is made aware that a fault condition exists only by the indication by indicating device 26 which, as noted above, receives fault indications from the monitoring devices by way of logic unit 25. Thus, the operator would not know which of the monitoring devices issued a fault signal.

As previously noted, a fault condition would cause relay coil 6a or 14a to conduct current through contact 21 of relay 22, and supply P1. Contact 21 is closed by the energization of coil 20, which receives power from a voltage control device 23. Voltage control device 23 is not shown in detail, but is of a known type which will discontinue the output current to relay coil 20 if the power supply voltage either fails or is lowered below a predetermined voltage. Such discontinuation and consequent disconnection of relay coils 6a and 14a from power supply P1, will prevent the recording of the false fault signals when power is switched on and off as desired. Thus, each time that the fault storage unit 24 is switched on, the state of contacts 8 and 16 remain undisturbed. The storage unit can be advantageously removed from the vehicle for inspection and later reassembled without disturbing the information corresponding to the state of relay contacts 8 and 16.

Erasing key 19 applies voltage to coils 6b and 14b so as to reset relays 7 and 15. In this manner, relay contacts 8 and 16 are returned to their original position, and any stored fault indications are cancelled.

Although this invention has been shown and described in terms of specific embodiments, it will be understood that persons of ordinary skill in the art may make various modifications to the invention, including using alternative electronic bistable devices in place of the bistable relays, without departing from the spirit and scope thereof.

What is claimed is:

1. An arrangement in a vehicle for detecting fault conditions which occur in electronic vehicle controls, the arrangement being of the type which uses at least a first output signal from a first monitoring device and a subsequent output signal, each such output signal being responsive to a fault condition, the arrangement further comprising:

first storage means including at least one bistable relay having a plurality of stable states, and which transfer from a first to a second stable state in response to the first output signal of the first monitoring device, the first storage means further having means for preserving the state of the bistable relay after the vehicle has been shut down and an energizing potential for the arrangement has been discontinued;

blocking means responsive to the second stable state of the first storage means for preventing changes in the state of the first storage means in response to the first output signal of the first monitoring device and the subsequent output signal; and, voltage control means for deenergizing the first storage means when a supply voltage at the first storage means falls below a predetermined voltage level.

2. An arrangement according to claim 1, wherein there is further provided display means responsive to a preselected one of the stable states of the storage means.

3. An arrangement according to claim 1, wherein there is further provided;

a second monitoring device having an output for providing a second output signal responsive to a further fault condition;

second storage means having a plurality of stable states, and which transfer from a first to a second stable state in response to the second output signal, said blocking means being responsive to the respective second stable states of the first and second storage means for preventing the transfer of the first and second output signals from the monitoring devices to the storage means.

* * * * *